(12) United States Patent
Hulse et al.

(10) Patent No.: US 9,648,378 B2
(45) Date of Patent: *May 9, 2017

(54) VIRTUAL USER INTERFACE INCLUDING PLAYBACK CONTROL PROVIDED OVER COMPUTER NETWORK FOR CLIENT DEVICE PLAYING MEDIA FROM ANOTHER SOURCE

(71) Applicant: Guest Tek Interactive Entertainment Ltd., Calgary (CA)

(72) Inventors: David Andrew Hulse, Athens (GR); Jason Thomas, Salt Lake City, UT (US)

(73) Assignee: Guest Tek Interactive Entertainment Ltd., Calgary (CA)

( * ) Notice: Subject to any disclaimer, the term of this patent is extended or adjusted under 35 U.S.C. 154(b) by 46 days.

This patent is subject to a terminal disclaimer.

(21) Appl. No.: 14/865,210

(22) Filed: Sep. 25, 2015

(65) Prior Publication Data

US 2016/0014450 A1   Jan. 14, 2016

Related U.S. Application Data

(63) Continuation of application No. 12/688,343, filed on Jan. 15, 2010.

(51) Int. Cl.
*G06F 15/16* (2006.01)
*H04N 21/431* (2011.01)
(Continued)

(52) U.S. Cl.
CPC ....... *H04N 21/4318* (2013.01); *G06F 9/4443* (2013.01); *H04N 21/2143* (2013.01);
(Continued)

(58) Field of Classification Search
USPC .......................................................... 709/203
See application file for complete search history.

(56) References Cited

U.S. PATENT DOCUMENTS

| 4,641,253 A | 2/1987 | Mastran |
| 5,319,455 A | 6/1994 | Hoarty |
| (Continued) | | |

FOREIGN PATENT DOCUMENTS

| CN | 1687893 A | 10/2005 |
| CN | 1913943 A | 2/2007 |
| (Continued) | | |

OTHER PUBLICATIONS

Office action dated Nov. 10, 2015 issued by SIPO in counterpart Chinese patent app. No. 200980159934.7 (English translation attached).

(Continued)

*Primary Examiner* — Vivek Srivastava
*Assistant Examiner* — Hermon Asres
(74) *Attorney, Agent, or Firm* — ATMAC Patent Services Ltd.; Andrew T. MacMillan

(57) ABSTRACT

A server is deployed on a network and manages operation of a plurality of server instances each with a virtual frame buffer. A client establishes a connection with the server at a start of a user session. The server allocates a server instance to the client and a user interface application renders a corresponding graphical user interface to the virtual frame buffer of the allocated server instance. The server forwards updates of the graphical user interface from the virtual frame buffer to the client, where at least some of the updates include transparency information for blending the graphical user interface with additional visual information at the client. When the session is complete the server reclaims the server instance allocated to the client. In-room device (Continued)

requirements in guest rooms of a hospitality establishment are thereby minimized while providing enhanced user interface performance. Locations in other applications include private residences and businesses.

20 Claims, 3 Drawing Sheets

(51) Int. Cl.
  *G06F 9/44* (2006.01)
  *H04N 21/214* (2011.01)
  *H04N 21/231* (2011.01)
  *H04N 21/239* (2011.01)
  *H04N 21/436* (2011.01)
  *H04N 21/472* (2011.01)
  *H04N 21/482* (2011.01)
  *H04N 21/6543* (2011.01)

(52) U.S. Cl.
  CPC ....... *H04N 21/231* (2013.01); *H04N 21/2393* (2013.01); *H04N 21/436* (2013.01); *H04N 21/4312* (2013.01); *H04N 21/47217* (2013.01); *H04N 21/482* (2013.01); *H04N 21/6543* (2013.01)

(56) References Cited

U.S. PATENT DOCUMENTS

| | | |
|---|---|---|
| 5,412,720 A | 5/1995 | Hoarty |
| 5,442,700 A | 8/1995 | Snell et al. |
| 5,485,197 A | 1/1996 | Hoarty |
| 5,524,195 A | 6/1996 | Clanton, III et al. |
| 5,526,034 A | 6/1996 | Hoarty et al. |
| 5,550,578 A | 8/1996 | Hoarty et al. |
| 5,557,316 A | 9/1996 | Hoarty et al. |
| 5,587,734 A | 12/1996 | Lauder et al. |
| 5,594,507 A | 1/1997 | Hoarty |
| 5,757,925 A | 5/1998 | Faybishenko |
| 5,774,664 A | 6/1998 | Hidary et al. |
| 5,774,670 A | 6/1998 | Montulli |
| 5,812,665 A | 9/1998 | Hoarty et al. |
| 5,818,935 A | 10/1998 | Maa |
| 5,883,661 A | 3/1999 | Hoarty |
| 5,926,647 A * | 7/1999 | Adams ............... G09G 5/024 345/589 |
| 6,034,678 A | 3/2000 | Hoarty et al. |
| 6,049,823 A | 4/2000 | Hwang |
| 6,055,315 A | 4/2000 | Doyle et al. |
| 6,064,377 A | 5/2000 | Hoarty et al. |
| 6,100,883 A | 8/2000 | Hoarty |
| 6,198,822 B1 | 3/2001 | Doyle et al. |
| 6,202,211 B1 | 3/2001 | Williams, Jr. |
| 6,205,582 B1 | 3/2001 | Hoarty |
| 6,253,238 B1 | 6/2001 | Lauder et al. |
| 6,263,346 B1 | 7/2001 | Rodriquez |
| 6,301,616 B1 | 10/2001 | Pal et al. |
| 6,305,020 B1 | 10/2001 | Hoarty et al. |
| 6,463,459 B1 | 10/2002 | Orr et al. |
| 6,571,245 B2 | 5/2003 | Huang et al. |
| 6,600,496 B1 * | 7/2003 | Wagner ............... H04N 5/445 348/E5.099 |
| 6,622,307 B1 | 9/2003 | Ho |
| 6,738,382 B1 | 5/2004 | West et al. |
| 6,907,574 B2 | 6/2005 | Xu et al. |
| 6,941,382 B1 | 9/2005 | Tuli |
| 6,996,073 B2 | 2/2006 | West et al. |
| 7,103,099 B1 | 9/2006 | Paz et al. |
| 7,254,786 B2 | 8/2007 | Henriquez |
| 7,580,376 B2 | 8/2009 | West et al. |
| 7,589,737 B2 | 9/2009 | Hochmuth et al. |
| 7,600,239 B2 | 10/2009 | De Lange et al. |
| 7,747,086 B1 * | 6/2010 | Hobbs ............... G06T 9/004 382/232 |
| 8,045,557 B1 | 10/2011 | Sun et al. |
| 8,209,717 B2 | 6/2012 | Pina |
| 8,732,749 B2 | 5/2014 | Hulse et al. |
| 8,854,195 B2 | 10/2014 | West et al. |
| 9,003,455 B2 | 4/2015 | Hulse et al. |
| 2002/0109712 A1 | 8/2002 | Yacovone et al. |
| 2002/0184630 A1 | 12/2002 | Nishizawa et al. |
| 2003/0025722 A1 | 2/2003 | Cliff et al. |
| 2003/0067554 A1 | 4/2003 | Klarfeld et al. |
| 2003/0234819 A1 | 12/2003 | Daly et al. |
| 2004/0024580 A1 | 2/2004 | Salmonsen et al. |
| 2004/0090597 A1 * | 5/2004 | De Haan ............... H04N 5/262 352/43 |
| 2005/0125835 A1 | 6/2005 | Wei |
| 2005/0256923 A1 | 11/2005 | Adachi |
| 2005/0283791 A1 | 12/2005 | McCarthy et al. |
| 2006/0117371 A1 | 6/2006 | Margulis |
| 2006/0184614 A1 | 8/2006 | Baratto et al. |
| 2006/0195884 A1 | 8/2006 | van Zoest et al. |
| 2006/0206820 A1 | 9/2006 | Bullard et al. |
| 2006/0230105 A1 | 10/2006 | Shappir et al. |
| 2006/0230156 A1 | 10/2006 | Shappir et al. |
| 2006/0277576 A1 | 12/2006 | Acharya et al. |
| 2007/0073730 A1 | 3/2007 | Jun |
| 2007/0174873 A1 | 7/2007 | Griggs |
| 2007/0199019 A1 | 8/2007 | Angiolillo et al. |
| 2007/0266123 A1 | 11/2007 | Johannesson |
| 2007/0299976 A1 | 12/2007 | Zafar et al. |
| 2008/0007559 A1 * | 1/2008 | Kalaiah ............... H04N 13/0275 345/501 |
| 2008/0034029 A1 | 2/2008 | Fang et al. |
| 2008/0170619 A1 | 7/2008 | Landau |
| 2008/0170622 A1 | 7/2008 | Gordon et al. |
| 2008/0178249 A1 | 7/2008 | Gordon et al. |
| 2008/0186979 A1 | 8/2008 | Kolar |
| 2008/0200154 A1 | 8/2008 | Maharajh et al. |
| 2008/0201736 A1 | 8/2008 | Gordon et al. |
| 2008/0212942 A1 | 9/2008 | Gordon et al. |
| 2008/0215671 A1 | 9/2008 | Lu et al. |
| 2008/0228865 A1 | 9/2008 | Cruzada |
| 2008/0313305 A1 | 12/2008 | Long |
| 2009/0006537 A1 | 1/2009 | Palekar et al. |
| 2009/0041118 A1 | 2/2009 | Pavlovskaia et al. |
| 2009/0059962 A1 | 3/2009 | Schmidt et al. |
| 2009/0080523 A1 | 3/2009 | McDowell |
| 2009/0100125 A1 | 4/2009 | McDowell |
| 2009/0100483 A1 | 4/2009 | McDowell |
| 2009/0119365 A1 | 5/2009 | Tomic |
| 2009/0172751 A1 | 7/2009 | Aldrey et al. |
| 2009/0196346 A1 | 8/2009 | Zhang et al. |
| 2009/0210817 A1 | 8/2009 | Schmieder et al. |
| 2009/0313674 A1 | 12/2009 | Ludvig et al. |
| 2009/0316709 A1 | 12/2009 | Polcha |
| 2009/0328109 A1 | 12/2009 | Pavlovskaia et al. |
| 2010/0031347 A1 * | 2/2010 | Ohto ............... G06F 8/65 726/19 |
| 2010/0064335 A1 | 3/2010 | Jenkin et al. |
| 2010/0082681 A1 | 4/2010 | Adimatyam et al. |
| 2010/0106766 A1 | 4/2010 | Bailey et al. |
| 2010/0111410 A1 * | 5/2010 | Lu ............... G06F 3/1415 382/166 |
| 2010/0118972 A1 | 5/2010 | Zhang et al. |
| 2010/0138476 A1 * | 6/2010 | Gokaraju ............... G06F 9/4445 709/203 |
| 2010/0158109 A1 | 6/2010 | Dahlby et al. |
| 2010/0191551 A1 | 7/2010 | Drance et al. |
| 2011/0126227 A1 | 5/2011 | Corvin |
| 2011/0157196 A1 | 6/2011 | Nave et al. |
| 2011/0179106 A1 | 7/2011 | Hulse et al. |
| 2012/0030706 A1 | 2/2012 | Hulse et al. |
| 2014/0059597 A1 | 2/2014 | Issa et al. |
| 2014/0250460 A1 | 9/2014 | Hulse et al. |
| 2015/0264427 A1 | 9/2015 | Hulse et al. |

FOREIGN PATENT DOCUMENTS

| | | |
|---|---|---|
| CN | 101022398 A | 8/2007 |
| CN | 101083714 A | 12/2007 |

(56) References Cited

FOREIGN PATENT DOCUMENTS

| | | |
|---|---|---|
| CN | 101568914 A | 10/2009 |
| EP | 1135722 A4 | 6/2005 |
| WO | 99/17549 A1 | 4/1999 |
| WO | 00/07091 A1 | 2/2000 |
| WO | 2008088741 A2 | 7/2008 |
| WO | 2008088772 A9 | 12/2008 |
| WO | 2009099895 A1 | 8/2009 |
| WO | 2009155214 A2 | 12/2009 |
| WO | 2010041267 | 4/2010 |
| WO | 2010044926 A2 | 4/2010 |
| WO | 2010054136 A2 | 5/2010 |

OTHER PUBLICATIONS

Office action dated Feb. 3, 2016 issued by SIPO in counterpart Chinese patent app. No. 201110041831.X (English translation attached).

International Search Report and Written Opinion of the International Searching Authority dated Apr. 30, 2010 (PCT/US2009/045996).

European Search Report and Opinion dated Apr. 21, 2011, EP Application No. 11150981.6.

T. Richardson, "The RFB Protocol", Version 3.3, pp. 1-26, retrieved from the Internet: URL: http://grox.net/doc/apps/vnc/rfbproto.pdf, dated Jan 1998.

F. Lamberti, et al., "A Streaming-based Solution for Remote Visualization of 3d Graphics on Mobile Devices", IEEE Transactions on Visualization and Computer Graphics, vol. 13, No. 2, Mar./Apr. 2007.

T. Richardson, et al. "Virtual Network Computing", IEEE Internet Computing, IEEE Service Center, New York, New York, vol. 2, No. 1, Jan. 1, 1998.

Australian Office Action dated Feb. 15, 2012, AU Application No. 2011200152.

P.N. Tudor, et al., "Read-Time Transcoding of MPEG-2 Video Bit Streams", BBC R&D IBC (1997) Amsterdam.

R. Kurceren, et al., "Compressed Domain Video Editing,", ICASSP, IEEE, 2006.

International Search Report and Written Opinion of the International Searching Authority dated Feb. 21, 2012, International application No. PCT/US2011/044688.

Extended European search report including search opinion for corresponding app. 11812960.0 at EPO; Jan. 22, 2014.

Australian Notice of Acceptance, Jun. 18, 2014, App No. 2009344302.

English translation of First Office Action and Search Report by State Intellectual Property Office, P.R. China, for app. No. 200980159934.7, Aug. 30, 2013.

Australian Office Action dated Feb. 21, 2014, AU Application No. 2011283037.

Office Action by SIPO dated Jul. 24, 2014 for Chinese Patent Application No. 200980159934.7 (Concise explanation of relevance attached).

Third Office action dated Dec. 22, 2014 from SIPO for counterpart Chinese app No. 200980159934.7. (English translation included).

English translation of 1st Chinese Office Action mailed by SIPO on Nov. 3, 2014 for Chinese counterpart application No. 201110041831.X.

Tristan Richardson, "The RFB Protocol", Version 3.8, Mar. 20, 2009.

Office action dated Jun. 22, 2015 for European counterpart application No. 11812960.0 (7 pages).

Office action dated Apr. 7, 2015 for European counterpart application No. 11150981.6 (3 pages).

Office action dated Jul. 15, 2015 issued by SIPO in counterpart Chinese patent app. No. 201110041831.X (English translation included).

Office action dated Aug. 26, 2015 issued by SIPO in counterpart Chinese patent app. No. 201180047198.3 (English translation included).

\* cited by examiner

US 9,648,378 B2

VIRTUAL USER INTERFACE INCLUDING PLAYBACK CONTROL PROVIDED OVER COMPUTER NETWORK FOR CLIENT DEVICE PLAYING MEDIA FROM ANOTHER SOURCE

CROSS-REFERENCE TO RELATED APPLICATIONS

The present application is a continuation of U.S. patent application Ser. No. 12/688,343 filed on Jan. 15, 2010, which is incorporated herein by reference.

BACKGROUND OF THE INVENTION (1) Field of the Invention

The present invention relates to providing a virtual user interface for a set top box or similar client device. More generally, the present invention enables user interface virtualization for any of a wide variety of applications and computing environments.

(2) Description of the Related Art

A conventional approach for facilitating user interaction with information or entertainment systems that employ set top boxes involves providing a user interface application that runs natively on the set top box. Such an application might be, for example, a Flash player that presents a menu hierarchy. Unfortunately, because of the typical capabilities of a set top box, the animation associated with such interfaces often is not rendered in a satisfactory manner, i.e., it may take on the order of seconds for the player to render any new information it receives (e.g., rendering a new sub-menu screen from a previous menu screen). Given what users have become accustomed to when interacting with user interfaces on desktop computer systems, this level of operation and user experience is unacceptable.

Because of the performance limitations and deployment costs associated with conventional set top boxes, it is desirable to provide solutions in which the software components that deliver media are as device independent as possible.

BRIEF SUMMARY OF THE INVENTION

According to the present invention, various methods, apparatus, and computer program products are provided for enabling user interface virtualization. According to a specific embodiment, a system is provided for providing virtual user interfaces over a network. The system includes one or more servers deployed on the network and configured to manage operation of a plurality of virtual frame buffers and a plurality of user interface applications. The one or more servers are further configured to associate each of the user interface applications with a corresponding one of the virtual frame buffers. Each user interface application is configured to render a corresponding graphical user interface to the corresponding virtual frame buffer. The one or more servers are further configured to establish a first dedicated, persistent, bi-directional connection with each of a plurality of clients via the network to conduct a virtual user interface session, to allocate one of the virtual frame buffers to each of the clients, and forward updates of the graphical user interface from each virtual frame buffer to the corresponding client via the first connection. At least some of the updates include transparency information for use in blending the graphical user interface with additional visual information at the corresponding client. The one or more servers are further configured to receive user input from each client via the first connection and provide the user input to the corresponding user interface application. The user input represents interaction of a user associated with each client with a representation of the corresponding graphical user interface. The system also includes the plurality of clients with associated displays. Each client is configured to receive the graphical user interface updates from the corresponding virtual frame buffer via the first connection, and to render the representation of the corresponding graphical user interface with the additional visual information on the associated display using the updates and the transparency information. Each client is further configured to transmit the user input to the one or more servers via the first connection.

According to other specific embodiments, methods, apparatus, and computer program products are provided for providing a virtual user interface over a network. According to these embodiments, operation of a plurality of virtual frame buffers is managed on one or more servers deployed on the network. In response to a connection request from a remote client, a user interface application operating on a first one of the one or more servers is associated with an allocated one of the virtual frame buffers. The user interface application is configured to render a graphical user interface to the allocated virtual frame buffer. A first dedicated, persistent, bi-directional connection is established between the first server and the remote client via the network to conduct a virtual user interface session. Updates of the graphical user interface are forwarded from the allocated virtual frame buffer to the remote client via the first connection. At least some of the updates include transparency information for use in blending the graphical user interface with additional visual information at the remote client. User input is received from the remote client via the first connection and provided to the user interface application. The user input represents interaction of a user associated with the remote client with a representation of the graphical user interface.

According to still other specific embodiments, methods, apparatus, and computer program products are provided for interacting with a virtual user interface over a network. A connection request is transmitted to a server via the network. The server is configured to manage operation of a plurality of virtual frame buffers and, in response to the connection request, associate a user interface application operating on the server with an allocated one of the virtual frame buffers. The user interface application is configured to render a graphical user interface to the allocated virtual frame buffer. A first dedicated, persistent, bi-directional connection to the server is established via the network to conduct a virtual user interface session. Updates of the graphical user interface are received from the allocated virtual frame buffer via the first connection. At least some of the updates include transparency information for use in blending the graphical user interface with additional visual information. A representation of the graphical user interface is rendered in conjunction with the additional visual information on a display using the updates and the transparency information. User input is forwarded to the server via the first connection for presentation to the user interface application. The user input represents interaction of a user with the representation of the graphical user interface.

Disclosed according to another exemplary embodiment of the invention is a system for providing virtual user interfaces over a network. The system includes one or more computer servers deployed on the network and operable to manage operation of a plurality of server instances each with an associated virtual frame buffer, and to manage operation of a plurality of user interface applications. The system further includes a client device coupled to both the network and a display. The client device is operable to send a request to the one or more servers over the network. The one or more servers are operable to allocate one of the server instances to the client device in response to receiving the request, and to associate one of the user interface applications with the server instance allocated to the client device, the user interface application operable to render a graphical user interface to the virtual frame buffer of the server instance allocated to the client device. The one or more servers are operable to forward to the client device updates of the graphical user interface from the virtual frame buffer of the server instance allocated to the client device. At least some of the updates including transparency information for use in blending the graphical user interface with video rendered by the client device. The one or more servers are operable to receive user input from the client device, provide the user input to the user interface application, and generate playback instructions for controlling playback of the video on the client device according to the user input. The user input represents interaction by a user of the client device with a representation of the graphical user interface. The one or more servers are operable to send the playback instructions to the client device via the network. The client device is operable to receive the graphical user interface updates and playback instructions from the one or more servers, receive media content for rendering the video from a source different than the one or more servers, play the video on the display according to the media content, further render on the display the representation of the graphical user interface overlaid on the video according to the updates and the transparency information, control playback of the video shown on the display according to the playback instructions, and transmit the user input to the one or more servers.

Disclosed according to another exemplary embodiment of the invention is a computer-implemented method for providing a virtual user interface over a network. The computer-implemented method includes managing operation of a plurality of server instances each with an associated virtual frame buffer on one or more servers deployed on the network; receiving by the one or more servers a request over the network, wherein the request is sent from a client device coupled to both the network and a display device; and in response to receiving the request, allocating one of the server instances to the client device by the one or more servers. The method further includes associating a user interface application operating on a first one of the one or more servers with the server instance allocated to the client device, wherein the user interface application is operable to render a graphical user interface to the virtual frame buffer of the server instance allocated to the client device. The method further includes forwarding updates of the graphical user interface to the client device from the virtual frame buffer of the server instance allocated to the client device, at least some of the updates including transparency information for use in blending the graphical user interface with video rendered by the client device. The method further includes receiving user input from the client device, wherein the user input represents interaction by a user of the client device with a representation of the graphical user interface; providing the user input to the user interface application; generating playback instructions for controlling playback of the video on the client device according to the user input; and sending the playback instructions to the client device via the network. The client device receives media content for rendering the video from a source different than the one or more servers, plays the video on the display according to the media content, further renders on the display the representation of the graphical user interface overlaid on the video according to the updates and the transparency information, and controls playback of the video shown on the display according to the playback instructions.

Disclosed according to yet another exemplary embodiment of the invention is a computing device operable to provide a virtual user interface. The computing device includes a memory device storing software instructions along with a plurality of virtual frame buffers each associated with one of a plurality of server instances; a network interface coupled to a network at the hospitality establishment; and one or more processors. By executing the software instructions in the memory device, the one or more processors are configured to: receive a request from a client device on the network, wherein the client device is coupled to a display; allocate one of the server instances to the client device in response to receiving the request from the client device; and associate a user interface application with the virtual frame buffer, the user interface application operable to render a graphical user interface to the virtual frame buffer of the server instance allocated to the client device. The processors are further configured to forward updates of the graphical user interface to the client device from the virtual frame buffer of the server instance allocated to the client device, at least some of the updates including transparency information for use in blending the graphical user interface with video rendered by the client device; receive user input from the client device and provide the user input to the user interface application, the user input representing interaction by a user of client device with a representation of the graphical user interface; generate playback instructions for controlling playback of the video on the client device according to the user input; and send the playback instructions to the client device via the network. The client device receives media content for rendering the video from a source different than the computing device, plays the video on the display according to the media content, further renders on the display the representation of the graphical user interface overlaid on the video according to the updates and the transparency information, and controls playback of the video shown on the display according to the playback instructions.

A further understanding of the nature and advantages of the present invention may be realized by reference to the remaining portions of the specification and the drawings.

DETAILED DESCRIPTION

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

According to various embodiments of the invention, virtual user interfaces running on one or more servers are presented on remote client devices. Such embodiments may be characterized as a service which pools, manages, and cleans up, virtual user interface sessions. Embodiments of the invention are described with reference to user interfaces associated with set top boxes that control operation of associated televisions (e.g., menu hierarchies). However, it should be noted that references to such embodiments are not intended to be limiting. Rather, embodiments of the invention are contemplated in which interfaces associated with any of a wide variety of applications may be presented in a manner which requires very little in the way of resources at the client, and which may be configured to be largely independent of client device hardware.

Figure 1:
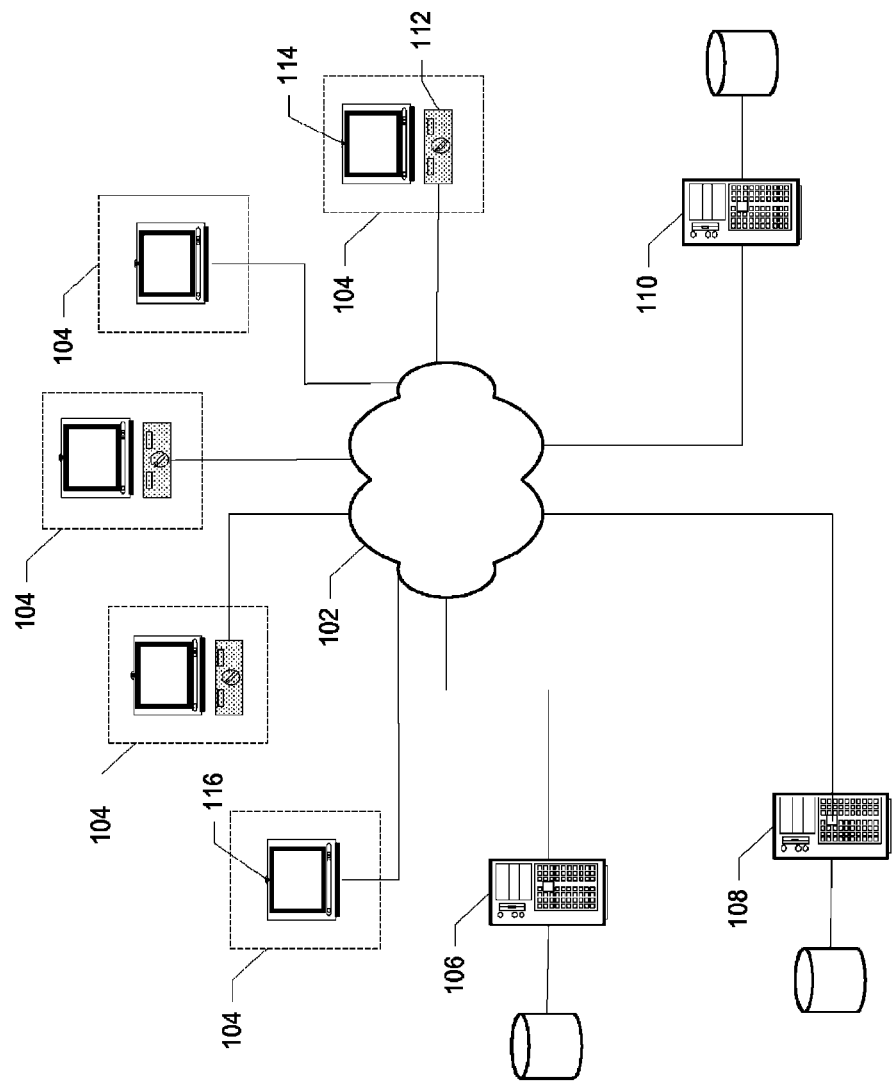
FIG. 1 is a simplified diagram illustrating an example of a system in which embodiments of the present invention may be implemented.

FIG. 1 shows a simplified diagram of a network environment in which embodiments of the present invention may be implemented. Network 102 may represent any combination of private and/or public local or wide area network(s) implemented with any of a wide variety of network technologies and communication protocols. For example, network 102 may represent one or more IP networks, cable networks, telecommunications networks, satellite television networks, wired or wireless networks, or any combination thereof. The hardware in various user locations 104 are connected via network 102 to servers 106, 108, and 110 (and associated data stores) which may be operated and/or controlled by one or more service providers. It will be understood that each representation of a server may represent multiple servers over which the various processes and computing loads associated with embodiments of the invention may be distributed. In this depiction, servers 106, 108, and 110 may represent various aspects of particular implementations such as, for example, virtual user interface servers, media servers, etc.

User location hardware may include a client device, e.g., a set top box 112, and an associated display, e.g., a television 114. Alternatively, display devices 116 may include sufficient integrated computing resources to interact with the remote servers in accordance with the invention, e.g., some new generation digital televisions. According to some embodiments, the user locations might be, for example, guest rooms in a hospitality context, with the intervening network being part of the hotel's private network infrastructure. Alternatively, the user locations might be private residences and/or businesses that subscribe to digital television and/or information services provided, for example, by cable or satellite system operators. According to another alternative, the user locations might be private residences and/or businesses connected to a public network such as the Internet. Those of skill in the art will appreciate the full range of possible embodiments with reference to these examples.

According to a particular class of embodiments, the user interface for a set top box is run on a virtual user interface (UI) server that is remote from the set top boxes in the system. As mentioned above, the virtual UI server may actually be multiple servers. Incremental graphical updates for the user interface are forwarded to the set top box via a dedicated communication channel using any of a variety of protocols such as, for example, virtual network computing protocol (VNC), remote desktop protocol (RDP), or Apple remote desktop protocol (ARD). More generally, embodiments of the present invention in this class of embodiments may be implemented using any known or proprietary protocol by which incremental graphical updates of an interface may be transmitted to a client, and in which user input received from the client drives the graphical updates.

As will be understood, a conventional VNC system typically includes a client, a server, and a relatively simple communication protocol referred to as RFB (i.e., remote frame buffer). A frame buffer is a memory buffer that contains color values for every pixel making up a display image at a given moment in time. As the frame buffer is modified by application software, the VNC server sends small rectangles of the frame buffer, corresponding to the regions that have changed since the last update, to the VNC client for rendering on an associated display. The client sends user input to the VNC server to drive these updates.

According to some embodiments relating to set top boxes, the set top box handles both playback of video streams and presentation of the user interface. As will be discussed, the user interface runs and is rendered to a frame buffer on a remote platform which transmits graphical updates of the interface to the set top box. According to various embodiments of the invention, when the updates are received by the set top box they are "blended" with the video being played by the set top box. According to some of these embodiments, this blending operation is facilitated by identifying whether portions of the information in the user interface updates are opaque, transparent, or semi-transparent, so that the corresponding pixels of the display may be rendered as graphics, video, or a combination of both.

An example of a particular architecture for providing virtual user interfaces in accordance with embodiments of the invention will now be described with reference to FIG. 2. According to some embodiments, the depicted components may be deployed in computing environments similar to the one depicted in FIG. 1. However, the various software components are shown without specific reference to the hardware or computing platforms on which the software components are operating because those of skill in the art will understand that such software components may be deployed in a wide variety of ways without departing from the scope of the invention. For example, system components on the server side may reside on the same or different computing platforms. Therefore, at least some of the specific references to the location or context of specific components should not be considered to limit the invention.

Figure 2:
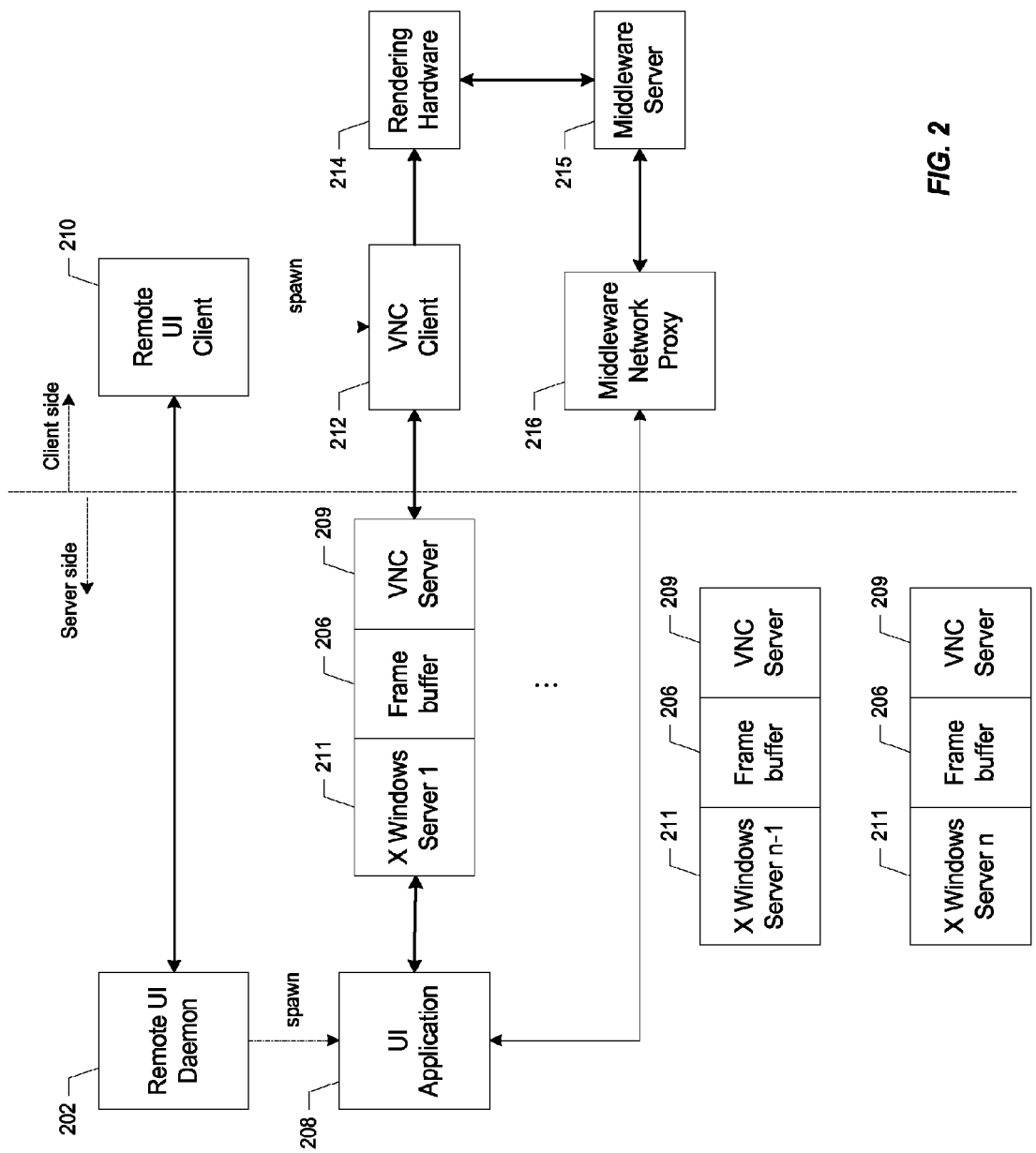
FIG. 2 is a block diagram illustrating various system components for a specific embodiment of the invention.
Figure 3:
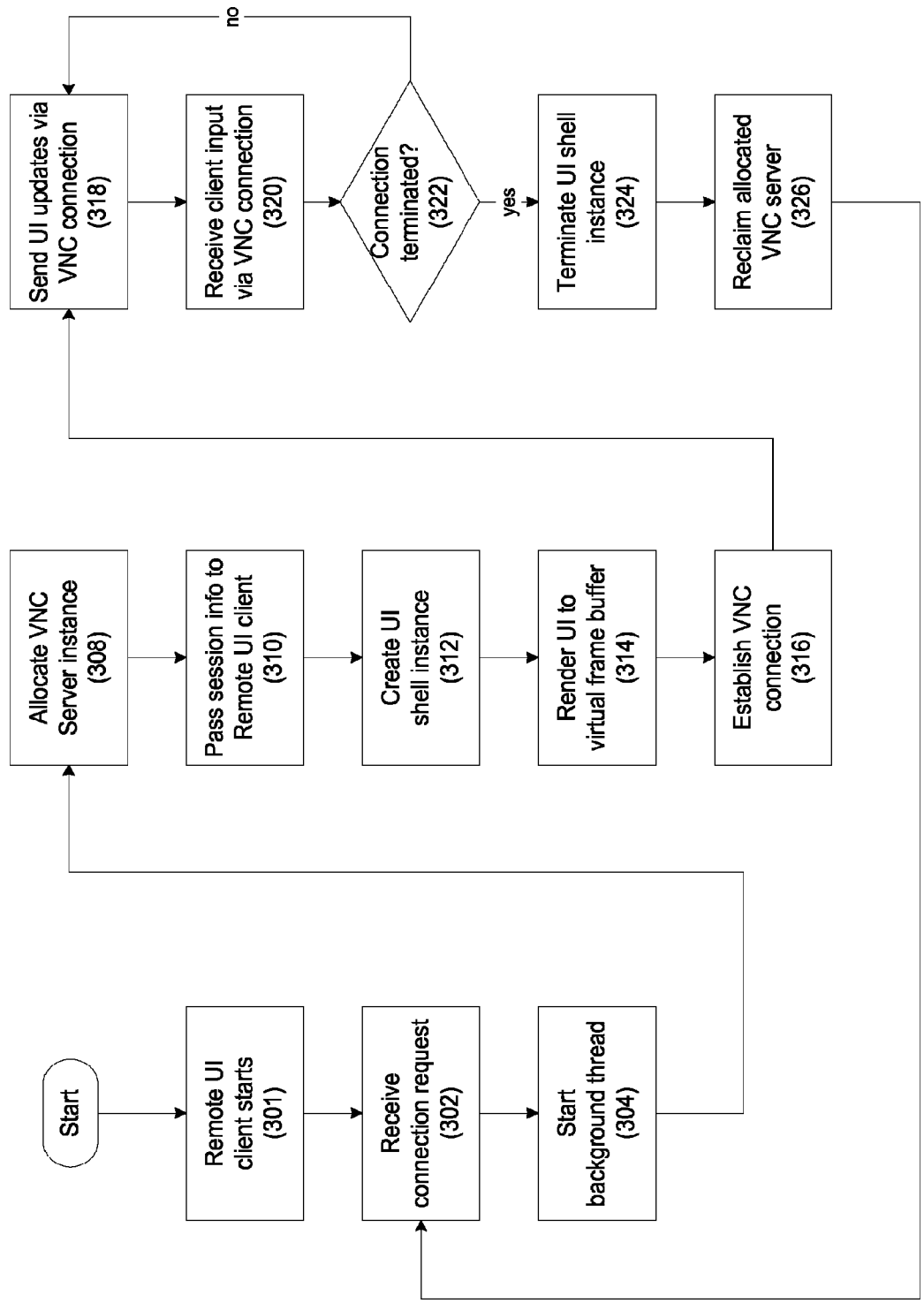
FIG. 3 is a flowchart illustrating operation of a specific embodiment of the invention.

Referring now to FIG. 2 and the flowchart of FIG. 3, when a client device powers up, a Remote UI Client 210 is started (301) and attempts to establish a connection, e.g., makes a TCP connection request, with a Remote User Interface Daemon 202 on a virtual UI server. Remote User Interface Daemon 202 listens for such connection requests from clients (302), and starts a background thread for each (304). The background threads initiated by Daemon 202 persist while their corresponding virtual user interface sessions (discussed below) persist.

Daemon 202 (which may be one of multiple such daemons operating in conjunction with each other) is responsible for managing a set of concurrent user interface sessions in the system. Daemon 202 maintains a list of available VNC server instances 209 running on the server, with associated virtual frame buffers 206. When it receives a connection request, Daemon 202 allocates one of the available VNC server instances to the connection (308) (removing it from the list), and passes session information back to the client by which the session may be identified (310). According to a specific embodiment, the session information includes an IP address and port number with which the client can connect to the allocated VNC server instance.

Daemon 202 also creates an instance of a user interface shell 208 (312) which runs on the virtual UI server. The user interface shell is created and rendered to the frame buffer associated with the allocated VNC server instance. According to a specific embodiment, the shell is an Adobe Flash player that generates the user interface. In contrast with a player that runs natively on a conventional set top box, shell 208 renders the user interface to the frame buffer associated with the allocated VNC server instance (314) rather than a frame buffer in the set top box. Because of the greater computing resources available on the server, the user interface frames may be rendered at a much higher frame rate than on a conventional set top box (nearly 100 times faster in a particular implementation).

In the depicted VNC-based implementation, each VNC server instance 209 is a VNC server coupled with an X Windows server 211 (e.g., Xvnc4). The X Windows server provides a rendering API for X Windows client applications, such as the user interface applications (208), rendering each such application into a frame buffer shared with the coupled VNC server. Each VNC server instance 209 operating on the server (which may be one or more servers) continuously monitors its associated frame buffer, and transmits graphical updates to the VNC client to which the VNC server instance has been allocated. According to specific embodiments, these updates are transmitted in response to update requests from the client, and do not necessarily correspond to the frames that are rendered into the buffer. Rather they are more typically some aggregation of pixels (typically one or more rectangular portions of the interface) that have changed since the last update was sent to the client. According to specific embodiments, it is up to the client to request either the full contents of the frame buffer or only an incremental update. In the latter case, the VNC server instance remembers the state of the virtual frame buffer when the client last requested an update, and transmits only the information that has changed since the last request. In addition, the VNC server may not respond immediately to a client's update request. That is, the VNC server may wait briefly to aggregate updates for transmission to the client to provide a more bandwidth-efficient response.

As discussed above, when the client device powers up, Remote UI Client 210 is started and establishes a connection with Daemon 202. Remote UI Client 210 then starts an implementation of a VNC client 212 (e.g., DirectVNC) on the client device, e.g., the set top box, which is the application that requests the interface updates from the allocated VNC server instance. Using the session information, VNC client 212 establishes a direct VNC connection with the VNC server instance allocated to the client (316) over which the interface updates are subsequently passed.

It should again be noted that, while the client device may in some embodiments be a set top box, implementations are contemplated in which the functionalities described herein are integrated into the hardware that ultimately renders the interface, e.g., a digital television with sufficient processing and memory resources. Alternatively, at least some of the functionalities described herein could be implemented in a separate, stand alone device that operates with a television, a set top box, or both.

Once the VNC connection is established, VNC client 212 requests updates from the corresponding VNC server instance (318), which it renders on the set top box. This is done via a connection between VNC client 212 and client device rendering hardware 214.

According to a particular class of embodiments, extensions to the VNC Protocol are provided for handling transparent pixel information. As is well known, within graphical systems, a frame buffer is a commonly used area of memory used to hold the color values of pixels that make up a display image. The manner in which pixels are stored within a frame buffer can take many different formats depending on the purpose of the frame buffer. For example, a frame buffer used for the storage of video frames might store pixels in a planar YUV420 format, whereas a frame buffer used for driving a display device might store pixels in a packed RGB format. These different formats are determined by the color space of the frame buffer and a pre-determined binary representation of a pixel within that color space. For example, an RGB color space could store pixels within a 16-bit word, with 5 bits allocated to the red and blue components and 6 bits allocated to the green component. Alternatively, 24-bits may be used with 8 bits allocated to each of the three color components. However, since 24-bits (3 bytes) is inconvenient to work with in computer systems with a 32-bit native word size, it is common to store RGB pixels in a 32-bit word, with 8 bits allocated to each color component, leaving a further 8-bits unused. The number of bits used to store a pixel is sometimes referred to as the color depth of the frame buffer.

In some graphical systems, particularly those in which it is contemplated that display images will be composited with other image sources (e.g., video frames), the frame buffer may also store transparency information along with each pixel. This transparency information is sometimes referred to as the "alpha channel" or "alpha component." The alpha component of a pixel determines the pixel's degree of transparency, ranging from completely opaque to completely invisible. Using standard image compositing rules well known to those of skill in the art, a frame buffer containing pixel data along with alpha information can be used to composite multiple images. A possible application of this would be to "blend" frames of video with a graphical layer such that a graphical user interface (rendered into the graphical layer) could be overlaid on the video in a translucent manner.

In an RGB frame buffer, where pixel information is stored using 24-bits within a 32-bit word, the unused 8-bits are commonly used to store the alpha channel information for each pixel. Such a pixel format is sometimes referred to as ARGB:8888, although other pixel formats including an alpha channel are also possible.

According to various embodiments of the present invention, the X Windows server is configured to render to a frame buffer storing pixels in the RGB format, using 24-bits to hold the RGB information within a 32-bit word. Standard X Windows client applications will render via the X Windows API into this RGB frame buffer. However, specialized applications, such as those that require rendering of transparency information, are able to access the X Windows frame buffer directly (using the standard XSHM extension to X Windows). These applications can use the unused 8-bits within each 32-bit pixel to store the alpha component for each pixel. Unfortunately, standard X Windows clients that do not take this approach will not necessarily correctly set the alpha component in each pixel (since X Windows does not support this directly) and so will "inherit" any preexisting alpha component for each pixel. For this reason, it is necessary to modify the standard X Windows server so that standard client applications will render an alpha component for each pixel resulting in fully opaque pixels. This change ensures that standard X Windows client applications will render in an opaque manner, whereas more specialized client applications can render in a translucent manner by directly setting the alpha component for each pixel.

Thus, embodiments of the present invention employ an X Windows server, modified as described above, coupled with a VNC server. The VNC server monitors the frame buffer shared with the X Windows server and provides graphical updates to VNC clients elsewhere in the network using the VNC protocol. An inherent part of the VNC protocol is the negotiation between client and server of the pixel format that graphical updates are to use. The VNC protocol defines several different pixel formats, none of which include an alpha component, i.e., the standard VNC protocol does not support transparency information. Therefore, these embodiments of the invention extend the VNC protocol to support additional pixel formats.

Extensions to the VNC protocol may be implemented by creating so-called pseudo encoding formats. A client will then signal that it supports a given extension by requesting a pseudo encoding corresponding to that extension. A server not supporting that extension will simply ignore the request, whereas a suitably enhanced server will respond by sending the client a proprietary acknowledgement message associated with the extension.

According to these embodiments of the present invention, the VNC protocol has been extended by adding a pseudo encoding message known as "Preserve Alpha Channel." When a client requests a server to abide by this pseudo encoding, the server responds by sending the client a proprietary acknowledgement message. The client then requests an RGB pixel format using 24-bits to store the RGB data within a 32-bit word, and the server ensures that all graphical updates preserve the alpha component data using the remaining 8 bits within the 32-bit word to transfer the alpha component of each pixel. In particular, the "ZRLE" method of sending graphical updates will not compress 32-bit pixels into 24-bits which would result in the loss of the alpha component data.

Referring back to FIG. 3, and according to some embodiments, VNC client 212 also forwards various types of input received from the set top box (e.g., user interaction with the virtual interface via a remote control, pointer, or mouse, or keyboard) to the VNC server instance (320) which passes them on to user interface shell 208 via the X Windows server API. Upon receipt of these user input events, the user interface application 208 reacts to the events, which may result in graphical updates being made to the user interface and therefore rendered into the frame buffer associated with the allocated X Windows server.

While the client device is operational, the user interface shell and VNC server instance allocated to the set top box persist, even while the set top box is playing other media and the user is not viewing or interacting with the virtual user interface. The connection, e.g., the TCP socket, that is established to initiate the user interface session is also maintained for the duration of the session to indicate that the resources allocated to that client (e.g. VNC server instance) are still being used (even though little or nothing is being transmitted over the connection). When the session ends (e.g., the client device is powered down), the TCP connection is terminated (322), and the Remote UI Daemon initiates a clean up on the server side involving termination of the user interface shell (324) and reclaiming of the VNC server instance (326).

It is worth noting that, in embodiments implemented using set top boxes, the actual media content selected by the user in the user interface and played by the set top box on the associated television is typically delivered to the set top box via another channel (e.g., a TCP or UDP connection between a remote media server and corresponding middleware operating on the set top box) not shown in FIG. 2.

According to a specific class of embodiments, movement of the user interface shell functionality from the set top box to a back end server involves a bifurcation of the functionality in the original shell that was native on the set top box. That is, in previous solutions in which a native user interface operated on the set top box, it interfaced with the rendering hardware of the set top box (i.e., to draw the interface into the frame buffer), as well as resident middleware (e.g., 215) to control media playback. According to a particular implementation of the present invention and as illustrated in FIG. 2, the user interface is moved to the back end, the interface to the rendering hardware is effectively replaced with the VNC client, and the interface to the middleware is replaced by a thin intervening "proxy" operating on the set top box that handles the communication with middleware 215. This "Middleware Remote Abstraction Layer" (e.g., Middleware Network Proxy 216) receives communications from the user interface shell via a network connection (e.g., a TCP socket) and translates them into inter-process communications recognized by the middleware, e.g., communications via Unix sockets that are established and persist while the set top box is operational. The socket between the shell and the abstraction layer may be established, for example, using the IP address of the client passed from Daemon 202 to shell 208.

According to a specific embodiment, the Middleware Remote Abstraction Layer may be characterized as an event delivery and retrieval system that is effectively an abstraction layer to the media capabilities of the underlying platform, i.e., it provides the necessary translation between the underlying hardware platform and the logic controlling it in the remote user interface. Calls handled by the Middleware Remote Abstraction Layer include, for example, information determining changes that need to be made to the state of the media playback device due to user interaction, e.g., tuning to a new television channel. For example, when a user presses "Channel Up" on his remote control, this produces a remote key press event that is consumed by the user interface shell running on the remote server. The logic in the user interface shell then determines what the next channel in the guide is and presents the corresponding details to the user. Upon selection of that channel, the user interface shell transmits a message over the middleware call socket with instructions to begin playback of the selected channel. The Middleware Remote Abstraction Layer thus only needs to provide a generic interface that may be presented in the same or similar manner on any piece of hardware, thereby exposing the platform's media playback capabilities. Notification events from the middleware to the user interface shell may include any sort of hardware or playback status updates. Examples of such events include a notification that the current clip has ended, the time position into the current clip, error status information, or anything at all relating to the dynamic status of the media or hardware capabilities of the target platform.

According to a specific set of embodiments, the abstraction mechanism provided by the Middleware Remote Abstraction Layer employs a set of local ports, and through these ports may provide end point services to local independent pieces of software. According to one such embodiment, the Middleware Remote Abstraction Layer maintains two Unix domain sockets connected to the middleware callback local socket and the middleware event delivery socket respectively. The Middleware Remote Abstraction Layer also maintains two network ports so that remote services can access the system as if they were a local process via a remote protocol. According to some embodiments, the Middleware Remote Abstraction Layer may also be employed to facilitate remote control of the set top box, e.g., for testing or debugging purposes.

It should be understood that the Middleware Remote Abstraction Layer is not a necessary component for all implementations of virtual user interfaces in accordance with the present invention. That is, as discussed above the Middleware Remote Abstraction Layer is provided as part of a solution in which most of the functionality of software originally designed to run on the set top box is moved to a back end server. Providing this abstraction layer allows such a solution without having to modify the existing middleware on the set top box. However, presenting other types of virtual user interfaces in accordance with the various embodiments of the present invention, depending on their functionality, may not require such an intervening proxy, e.g., applications that do not require control over media playback, or should not have such control capabilities.

More generally, embodiments of the invention are contemplated in which the user interface shell operating on the virtual UI server may be replaced with any arbitrary application configured to render itself into a frame buffer via an X Windows server. According to a particular class of embodiments, such applications preferably do not include much if any video content in that the rendering of video on a remote client might not be entirely satisfactory if delivered via a VNC connection. That is, the frame rate required to correctly render video will not generally match the rate of incremental updates performed with a VNC-like approach, thus resulting in various undesirable video artifacts such as "tearing" or partially rendered video frames. A suitable alternative for delivering such video content is described in U.S. patent application Ser. No. 12/473,086 for VIRTUAL DESKTOP SERVICES filed on May 27, 2009, the entire disclosure of which is incorporated herein by reference for all purposes.

In view of the foregoing, embodiments are contemplated in which virtual user interfaces generated in accordance with the present invention include audio content. According to some such embodiments, an audio stream associated with the interface is transmitted to the client in addition to the graphic updates to the interface described above. This may be done, for example, using a proprietary extension of the VNC protocol. Alternatively, a secondary audio channel may be provided by a separate protocol (e.g. Pulse Audio).

The ability to run arbitrary applications remotely in accordance with some embodiments of the invention effectively turns embedded client devices into open platforms that can enjoy a much broader range of third party development of software applications. That is, the very nature of the embedded, proprietary computing environments of set top boxes associated with cable or satellite television systems, or with other proprietary digital television systems, presents barriers to the development of applications for such platforms by third party developers. By contrast, embodiments of the invention are able to create such opportunities by enabling the remote operation and delivery of arbitrary applications on more standard server platforms, thus enabling applications which are traditionally only available on desktop computing systems to be available on embedded computing platforms.

Embodiments of the invention may be employed to move a wide range of functionality (e.g., rasterization, font rendering, graphics processing, etc.) to a back end service. The role of the client device may therefore be significantly reduced, e.g., forwarding user input, rendering provided visual updates, and exposing an API to interface with its media playback capabilities. The responsiveness, rendering capabilities, and logic capabilities for any given application can thus be made device neutral. Dependencies porting to other platforms may also be eliminated, by removing a dependency on a graphics rendering system, and replacing it with a thin client with a small source base. The thin client can be configured to require no support libraries, and only bare-minimum standard features, e.g., network sockets, and a frame buffer to update. New software features and components that are neutral to the target platform may also be quickly and easily integrated since the server architecture (e.g., an x86 platform) will typically be running a fully featured operating system with all of the necessary libraries to run any modern piece of software. Thus, embodiments of the invention are contemplated that entirely eliminate having to port, provide libraries for, or tune, virtually any software one might wish to provide to an end user on virtually any client device, including proprietary set top box environments and the like.

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A system for providing virtual user interfaces over a network, the system comprising:
one or more computer servers deployed on the network and managing operation of a plurality of server instances each with an associated virtual frame buffer, and managing operation of a plurality of user interface applications; and
a client device coupled to both the network and a display;
wherein the client device sends a request to the one or more servers over the network;
the one or more servers allocate one of the server instances to the client device in response to receiving the request, and associate one of the user interface applications with the server instance allocated to the client device, the user interface application rendering a graphical user interface to the virtual frame buffer of the server instance allocated to the client device;
the one or more servers forward to the client device updates of the graphical user interface from the virtual frame buffer of the server instance allocated to the client device, at least some of the updates including transparency information for use in blending the graphical user interface with video rendered by the client device;
the one or more servers receive user input from the client device, provide the user input to the user interface application, and generate playback instructions for controlling playback of the video on the client device according to the user input, the user input representing interaction by a user of the client device with a representation of the graphical user interface;

the one or more servers send the playback instructions to the client device via the network; and the client device receives the graphical user interface updates and playback instructions from the one or more servers, receives media content for rendering the video from a source different than the one or more servers, plays the video on the display according to the media content, further renders on the display the representation of the graphical user interface overlaid on the video according to the updates and the transparency information, controls playback of the video shown on the display according to the playback instructions, and transmits the user input to the one or more servers.

2. The system of claim 1, wherein:

the client device sends the request to the one or more servers at a start of a user session; and the one or more servers reclaim the server instance allocated to the client device when the user session is complete.

3. The system of claim 1, wherein the client device is implemented in a set top box providing interactive television services on an associated display coupled to the set top box.

4. The system of claim 1, wherein the graphical user interface comprises an interactive menu for navigating interactive television services.

5. The system of claim 1, wherein the client device is integrated within the display of the client device.

6. The system of claim 1, wherein the display is located in one of a plurality of guest rooms of a hospitality establishment.

7. The system of claim 1, wherein the one or more servers forward to the client device the updates of the graphical user interface utilizing a virtual network computing (VNC) connection, a remote desktop protocol (RDP) connection, or an Apple remote desktop protocol (ARD) connection.

8. The system of claim 1, wherein the one or more servers include the transparency information in at least some of the updates in response to a pseudo encoding message received from the client device.

9. The system of claim 1, wherein each update comprises only one or more portions of the graphical user interface that has changed since a previous update.

10. A computer-implemented method for providing a virtual user interface over a network; the computer-implemented method comprising:

managing operation of a plurality of server instances each with an associated virtual frame buffer on one or more servers deployed on the network;

receiving by the one or more servers a request over the network, wherein the request is sent from a client device coupled to both the network and a display device;

in response to receiving the request, allocating one of the server instances to the client device by the one or more servers;

associating a user interface application operating on a first one of the one or more servers with the server instance allocated to the client device, wherein the user interface application renders a graphical user interface to the virtual frame buffer of the server instance allocated to the client device;

forwarding updates of the graphical user interface to the client device from the virtual frame buffer of the server instance allocated to the client device, at least some of the updates including transparency information for use in blending the graphical user interface with video rendered by the client device;

receiving user input from the client device, wherein the user input represents interaction by a user of the client device with a representation of the graphical user interface;

providing the user input to the user interface application;

generating playback instructions for controlling playback of the video on the client device according to the user input; and sending the playback instructions to the client device via the network;

wherein the client device receives media content for rendering the video from a source different than the one or more servers, plays the video on the display according to the media content, further renders on the display the representation of the graphical user interface overlaid on the video according to the updates and the transparency information, and controls playback of the video shown on the display according to the playback instructions.

11. The computer-implemented method of claim 10, further comprising:

receiving by the one or more servers the request from the client device at a start of a user session; and reclaiming by the one or more servers the server instance allocated to the client device when the user session is complete.

12. The computer-implemented method of claim 10, wherein the graphical user interface comprises an interactive menu for selecting the interactive television services.

13. The computer-implemented method of claim 10, further comprising forwarding to the client device the updates of the graphical user interface utilizing a virtual network computing (VNC) connection, a remote desktop protocol (RDP) connection, or an Apple remote desktop protocol (ARD) connection.

14. The computer-implemented method of claim 10, wherein the transparency information is included in at least some of the updates in response to a pseudo encoding message received from the client device.

15. The computer-implemented method of claim 10, wherein each update comprises only one or more portions of the graphical user interface that has changed since a previous update.

16. A non-transitory computer-readable medium comprising computer executable instructions that when executed by a computer cause the computer to perform a method of providing a virtual user interface over a network; the method comprising:

managing operation of a plurality of server instances each with an associated virtual frame buffer on one or more servers deployed on the network;

receiving by the one or more servers a request over the network, wherein the request is sent from a client device coupled to both the network and a display device;

in response to receiving the request, allocating one of the server instances to the client device by the one or more servers;

associating a user interface application operating on a first one of the one or more servers with the server instance allocated to the client device, wherein the user interface application renders a graphical user interface to the virtual frame buffer of the server instance allocated to the client device;
forwarding updates of the graphical user interface to the client device from the virtual frame buffer of the server instance allocated to the client device, at least some of the updates including transparency information for use in blending the graphical user interface with video rendered by the client device;
receiving user input from the client device, wherein the user input represents interaction by a user of the client device with a representation of the graphical user interface;
providing the user input to the user interface application;
generating playback instructions for controlling playback of the video on the client device according to the user input; and
sending the playback instructions to the client device via the network;
wherein the client device receives media content for rendering the video from a source different than the one or more servers, plays the video on the display according to the media content, further renders on the display the representation of the graphical user interface overlaid on the video according to the updates and the transparency information, and controls playback of the video shown on the display according to the playback instructions.

17. A computing device providing a virtual user interface, the computing device comprising:
a memory device storing software instructions along with a plurality of virtual frame buffers each associated with one of a plurality of server instances;
a network interface coupled to a network at the hospitality establishment; and
one or more processors; wherein, by executing the software instructions in the memory device, the one or more processors are configured to:
receive a request from a client device on the network, wherein the client device is coupled to a display;
allocate one of the server instances to the client device in response to receiving the request from the client device;
associate a user interface application with the virtual frame buffer, the user interface application rendering a graphical user interface to the virtual frame buffer of the server instance allocated to the client device;
forward updates of the graphical user interface to the client device from the virtual frame buffer of the server instance allocated to the client device, at least some of the updates including transparency information for use in blending the graphical user interface with video rendered by the client device;
receive user input from the client device and provide the user input to the user interface application, the user input representing interaction by a user of client device with a representation of the graphical user interface;
generate playback instructions for controlling playback of the video on the client device according to the user input; and
send the playback instructions to the client device via the network;
wherein the client device receives media content for rendering the video from a source different than the computing device, plays the video on the display according to the media content, further renders on the display the representation of the graphical user interface overlaid on the video according to the updates and the transparency information, and controls playback of the video shown on the display according to the playback instructions.

18. The computing device of claim 17, wherein the software instructions further configure the one or more processors to:
receive the request from the client device at a start of a user session; and
reclaim the server instance allocated to the client device when the user session is complete.

19. The computing device of claim 17, wherein the graphical user interface comprises an interactive menu for selecting the interactive television services.

20. The computing device of claim 17, wherein the display is located in one of a plurality of guest rooms of a hospitality establishment.

\* \* \* \* \*